(12) United States Patent
Le Roux et al.

(10) Patent No.: US 11,312,479 B2
(45) Date of Patent: Apr. 26, 2022

(54) FORCE APPLICATION DEVICE FOR A CONTROL STICK OF AN AIRCRAFT

(71) Applicant: SAFRAN ELECTRONICS & DEFENSE, Paris (FR)

(72) Inventors: Corentin Le Roux, Moissy-Cramayel (FR); Mickael Werquin, Moissy-Cramayel (FR); Yannick Attrazic, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/418,456

(22) PCT Filed: Dec. 26, 2019

(86) PCT No.: PCT/FR2019/053298
§ 371 (c)(1),
(2) Date: Jun. 25, 2021

(87) PCT Pub. No.: WO2020/136356
PCT Pub. Date: Jul. 2, 2020

(65) Prior Publication Data
US 2022/0063794 A1    Mar. 3, 2022

(30) Foreign Application Priority Data
Dec. 28, 2018   (FR) ..................... 1874312

(51) Int. Cl.
*G05G 9/047*   (2006.01)
*B64C 13/04*   (2006.01)
(Continued)

(52) U.S. Cl.
CPC ......... *B64C 13/0421* (2018.01); *G05G 5/005* (2013.01); *G05G 5/03* (2013.01);
(Continued)

(58) Field of Classification Search
CPC ...... B64C 13/0421; G05G 2009/04766; G05G 2009/04714; G05G 2009/04703
See application file for complete search history.

(56) References Cited

U.S. PATENT DOCUMENTS 5,129,277 A * 7/1992 Lautzenhiser ......... G05G 9/047
338/128
5,675,359 A * 10/1997 Anderson ............... G05G 9/047
200/6 R
(Continued)

FOREIGN PATENT DOCUMENTS

FR    3025493 A1   3/2016
FR    3058806 A1   5/2018
(Continued)

OTHER PUBLICATIONS

Machine Translation of WO 2020/053534, obtained Jan. 26, 2021.*
(Continued)

*Primary Examiner* — Richard W Ridley
*Assistant Examiner* — Brian J McGovern
(74) *Attorney, Agent, or Firm* — Sughrue Mion, PLLC

(57) ABSTRACT

The invention relates to a force application device for a control stick of an aircraft, said stick comprising a control lever that is connected to a motor comprising a drive shaft, said device having: a first pin connected to the drive shaft, a housing, a second pin secured to the housing, an electromagnet secured in relation to the housing, a movable actuator which comprises a magnetic material such that said actuator can be displaced depending on a supply of current of the electromagnet, and means for clamping the first pin and the second pin which comprise a first tooth and a second tooth, said device having an operating configuration in which the electromagnet is active and the actuator separates the teeth away from the first pin and the second pin, and a blocking configuration in which the electromagnet is inac- (Continued)

tive, with the first tooth and the second tooth coming into contact with the first pin and the second pin.

7 Claims, 5 Drawing Sheets

(51) Int. Cl.
  *G05G 5/03* (2008.04)
  *G05G 5/00* (2006.01)
(52) U.S. Cl.
  CPC ... *G05G 9/047* (2013.01); *G05G 2009/04766* (2013.01); *G05G 2009/04774* (2013.01); *G05G 2505/00* (2013.01)

(56) References Cited

U.S. PATENT DOCUMENTS

| | | | | |
|---|---|---|---|---|
| 2016/0061146 | A1* | 3/2016 | Werquin | F16H 25/2454 92/15 |
| 2017/0308113 | A1* | 10/2017 | Izzo | B64C 13/12 |

FOREIGN PATENT DOCUMENTS

| | | | | |
|---|---|---|---|---|
| FR | 3072942 B1 | * | 11/2019 | ............. B64C 13/04 |
| FR | 3091262 A1 | * | 7/2020 | ......... B64C 13/0421 |
| WO | WO-2020053534 A1 | * | 3/2020 | ............... G05G 5/03 |
| WO | WO-2020128403 A1 | * | 6/2020 | ............. G05G 9/047 |
| WO | WO-2021079075 A1 | * | 4/2021 | ........... B64C 13/345 |

OTHER PUBLICATIONS

Machine Translation of WO 2021/079075, obtained Jan. 26, 2021.*
Machine Translation of FR 3072942, obtained Jan. 26, 2021.*
Machine Translation of FR 3091262, obtained Jan. 26, 2021.*
Machine Translation of WO 2020/128403, obtained Jan. 26, 2021.*
International Search Report dated Apr. 28, 2020 from the International Searching Authority in International Application No. PCT/FR2019/053298.
Written Opinion dated Apr. 28, 2020 from the International Searching Authority in International Application No. PCT/FR2019/053298.
Written Opinion and Search Report dated Oct. 18, 2019 from the French Patent Office in French Application No. 1874312.

* cited by examiner

[Fig. 1]
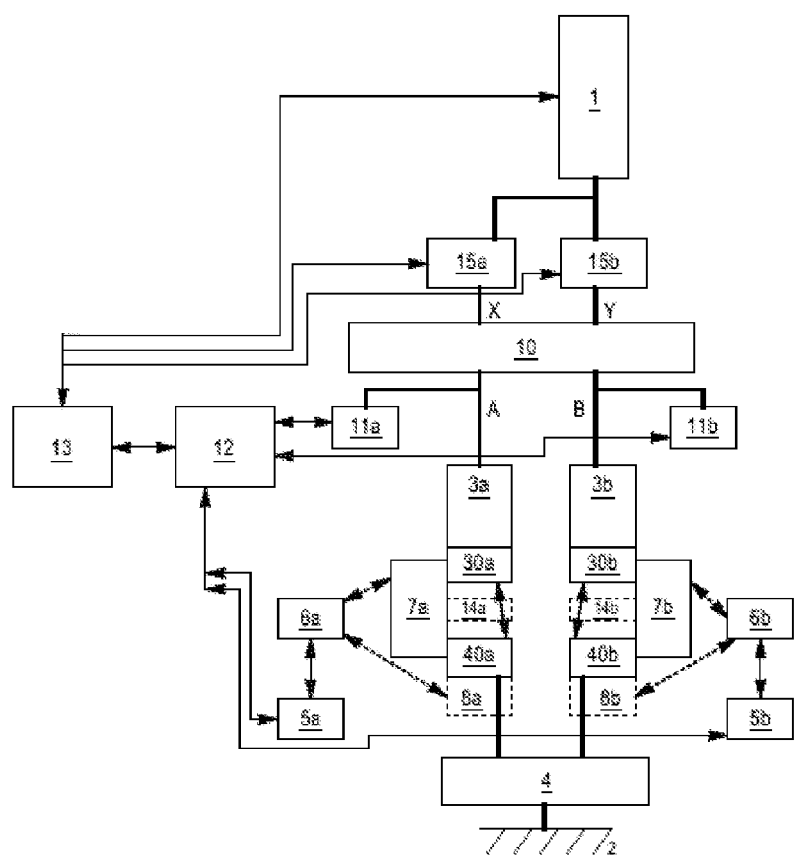

[Fig. 2]
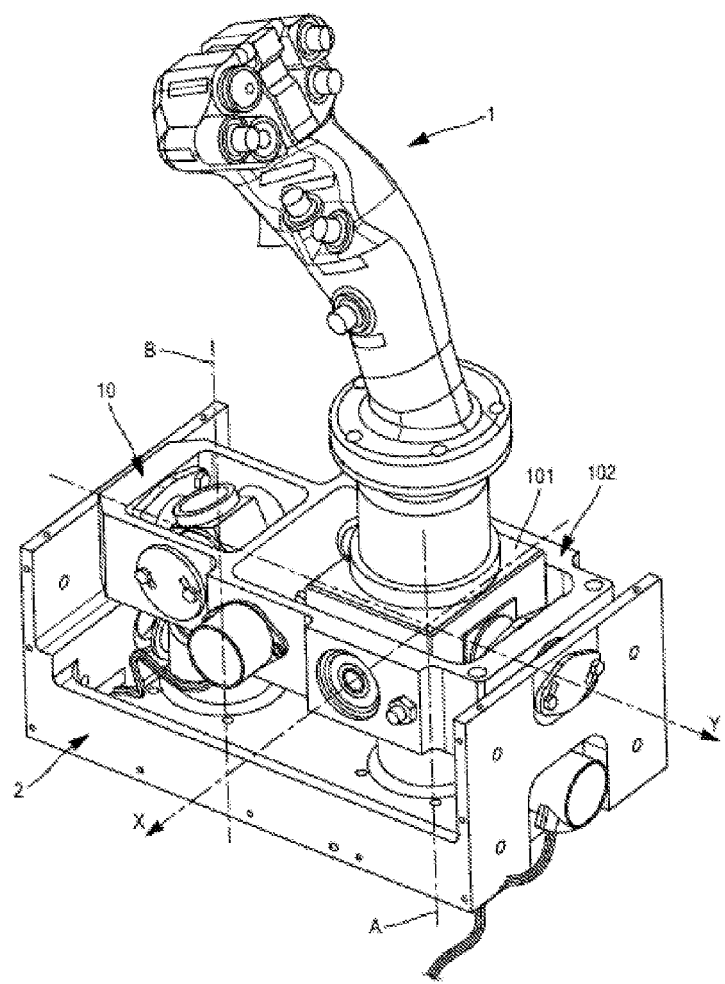

[Fig. 3]
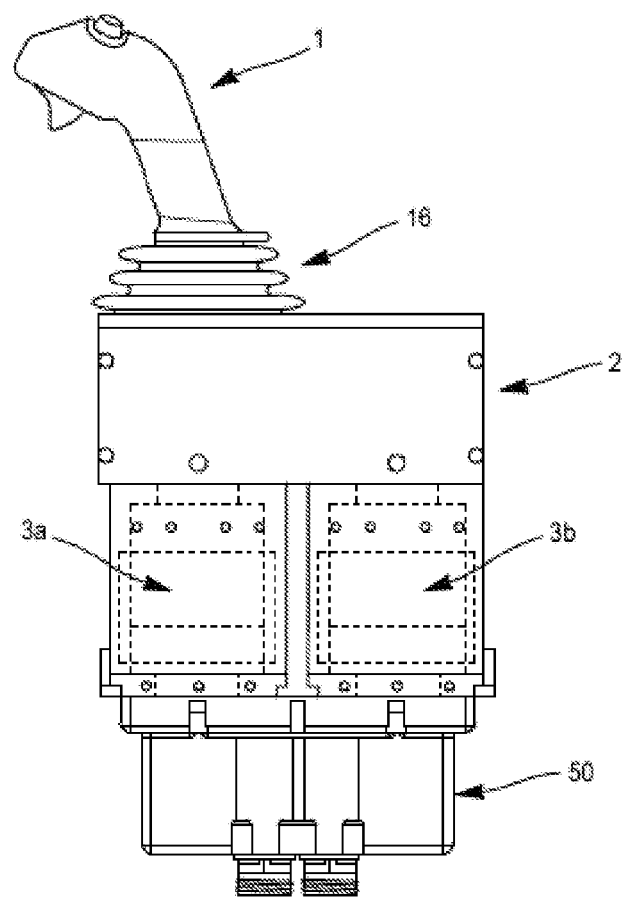

[Fig. 4]
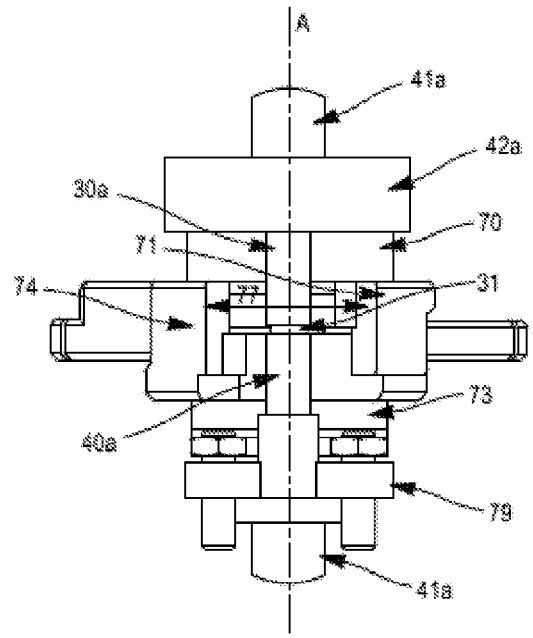
[Fig. 5]
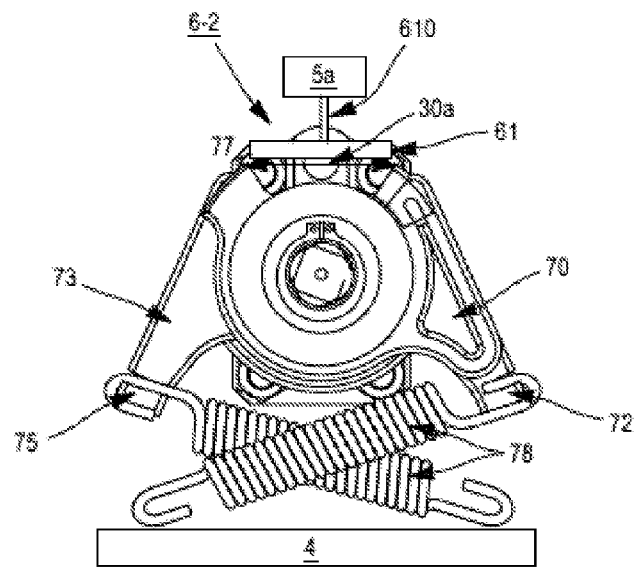

[Fig. 6]
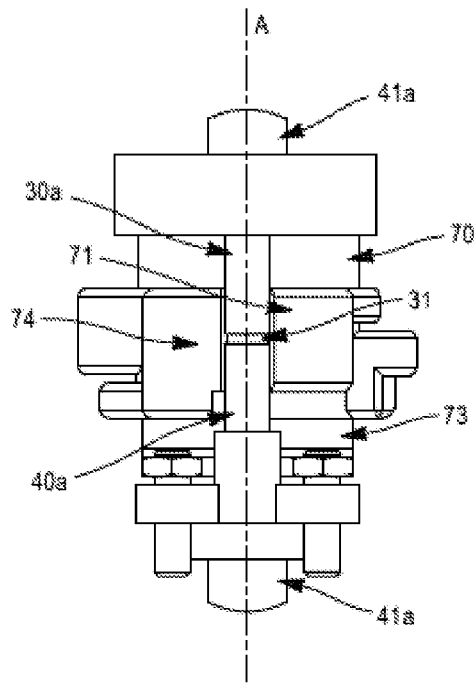
[Fig. 7]
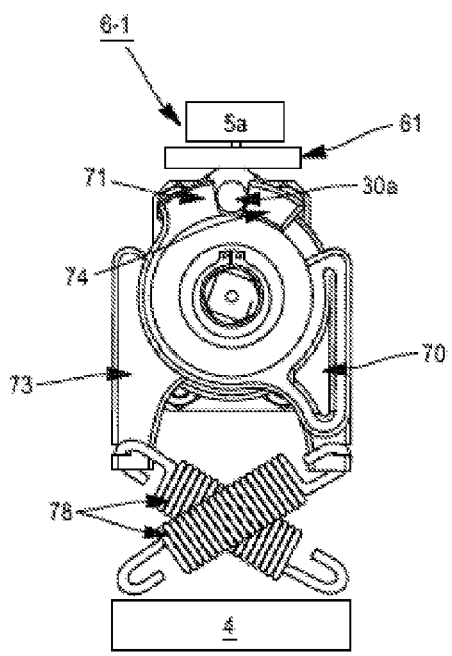

FORCE APPLICATION DEVICE FOR A CONTROL STICK OF AN AIRCRAFT

CROSS-REFERENCE TO RELATED APPLICATIONS

This application is a National Stage of International Application No. PCT/FR2019/053298 filed Dec. 26, 2019, which claims priority under U.S.C. § 119(a) to French Patent Application No. 1874312 filed on Dec. 28, 2018, the entire contents of each of which being herein incorporated by reference in their entireties.

FIELD OF THE INVENTION

The invention relates to control devices used by the pilot in an aircraft cockpit. It particularly relates to an active stick comprising integrated force feedback to assist the pilot.

TECHNICAL BACKGROUND

A control device in an aircraft cockpit usually comprises a control stick with in particular a control lever mounted rotatably along a so-called roll axis and a so-called pitch axis, these two axes being both orthogonal to one another. Devices of the "joystick" type are most commonly encountered.

As a function of the position of the lever along these two axes, the control device transmits displacement commands to control members of the aircraft.

In more recent aircraft models, control of the aircraft movements is electronic and the control device integrated into the cockpit can be of "sidestick" type. The position of the lever along the two roll and pitch axes is measured by sensors and converted into movement controls. The lever is not directly linked mechanically to the movable parts of the aircraft. There is no direct mechanical feedback on the lever for the pilot.

However, it is desirable for the flight safety that the pilot experiences mechanical feedback on the lever. The indicator systems of the cockpit cannot be sufficient to cause a quick enough reaction of the pilot faced with unexpected events during the flight. The sensations of control are often much better if the control sidestick includes force feedback, also known as "haptic feedback".

In this regard, sidesticks equipped with passive mechanical systems, such as spring systems, or active electromechanical systems have been provided.

Moreover, provision has been made in the document FR 3 011 815 for an active force feedback with an electric motor. Typically, in this document, the aircraft flight control device includes a control lever mounted on a plate and connected to a roll axis motor and a pitch axis motor by way of transmission shafts. The two motors are controlled according to a force law, such as to generate a resistive force opposing the force exerted on the lever (force feedback) when a force threshold is exceeded by the pilot.

Such a device proves effective in restoring the sensations of control and in increasing flight safety. However, in the event of an electrical or mechanical fault in one of the motors or in the event of a malfunction on the control signal processing of the motors, the force feedback can be removed.

In the field of aeronautics, the requirements regarding availability of piloting devices are high. It is therefore not acceptable that the pilot goes abruptly into a feedback-less piloting mode in the event of a malfunction of an engine or its processing chain.

Furthermore, the active force feedback systems of the prior art often comprise a large number of components, particularly the roll and pitch motors but also clutches, torque limiters, gears etc. These systems can prove expensive, bulky and difficult to integrate into an aircraft cockpit.

SUMMARY OF THE INVENTION

In view of the above, a need exists for a control stick incorporating a mechanical back-up channel, to prevent the rotation of the lever being free and the pilot losing all force feedback, in the event of an electrical faulting affecting a force feedback motor.

The desired stick must not be able to toggle, in the event of a malfunction affecting said motor, into a mode in which the pilot freely pivots the lever.

A secondary need exists for a control stick wherein, in the event of a malfunction affecting said motor, the lever is not completely immobilized.

Preferably, the desired mechanical back-up channel supplies a variable resistive force as a function of the position of the lever with respect to a neutral point, in the event of a malfunction affecting the force feedback motor.

A sidestick of lower weight, bulk and power consumption than the existing sidesticks is also desired.

In this regard, according to a first aspect, the invention relates to a force application device for a control stick of an aircraft, wherein the control stick comprises a control lever connected to at least one motor comprising a drive shaft rotationally movable about an axis, the force application device comprising:
 a first pin, connected to the shaft,
 a casing, configured to be fixed with respect to the aircraft,
 a second pin, attached to the casing,
 an electromagnet, fixed with respect to the casing,
 an actuator that is movable with respect to the casing, said actuator comprising a magnetic material,
 a first tooth and a second tooth for clamping the first pin and the second pin, the first tooth and the second tooth being movable with respect to the first pin and the second pin,
 the force application device having an operational configuration, wherein the electromagnet is active and the actuator is positioned between the first tooth and the second tooth such that the first tooth and the second tooth are distant from the first pin and the second pin, and a locking configuration wherein the electromagnet is inactive and the actuator is retracted, such that the first tooth and the second tooth are in contact with the first pin and the second pin.

A first advantage of the invention is to supply a mechanical back-up channel to prevent the lever from being completely free in its pivoting movement. In the event of a fault affecting the motor, the electromagnet is no longer active and the force application device enters a locking configuration.

A resistive torque, opposing the rotation of the first pin with respect to the casing, is exerted on the first pin when the force application device is in the locking configuration. Specifically, the teeth clamp the first pin and the second pin, and the second pin rotates as a single part with respect to the casing. The drive shaft is then braked in its rotational movement.

An advantage of the invention is that the mechanical back-up channel supplied by the force application device is reversible, the force application device being able to enter an operational configuration again when the electromagnet is active again.

A second advantage is to avoid the complete immobilization of the drive shaft associated with the motor, when an electrical malfunction affects the motor and when the electromagnet is no longer active. Specifically, the clamping means do not necessarily completely lock a rotation of the first pin with respect to the second pin.

It is to be noted that the force application device of the invention, when in the locking configuration, tends to bring the control lever to a fixed neutral point. Since the second pin is fixed with respect to the casing, the neutral point does not depend on the position of the first pin when the device enters the locking configuration.

Advantageously, the actuator of said force application device is displaceable as a function of a supply of current to the electromagnet.

Optional and non-limiting features of the force application device defined above are as follows, taken alone or in any of their technically possible combinations:
- the actuator comprises a magnetic piston.
- a direction of displacement of the magnetic piston belongs to a plane orthogonal to a longitudinal direction of the first pin and orthogonal to a longitudinal direction of the second pin.
- the force application device further comprises a first jaw and a second jaw, and one end of the first jaw and one end of the second jaw are linked to the casing by respective springs.
- the force application device further comprises an angular displacement sensor configured to acquire a measurement of the angular displacement of the drive shaft.
- the force application device further comprises a damping piece extending over a contact surface between the first pin and the second pin.

According to another aspect, the invention relates to a control stick of an aircraft comprising a control lever, comprising at least one motor having a drive shaft, the drive shaft being rotationally movable about an axis, and the stick further comprising one force application device (as defined above) per motor.

BRIEF DESCRIPTION OF THE DRAWINGS

Other features, aims and advantages of this invention will become more apparent on reading the following detailed description, accompanied by the appended drawings given by way of non-limiting example wherein:

FIG. 1 functionally represents the overall architecture of a control system comprising a control stick;

FIG. 2 is a perspective view of the aircraft control lever and the mechanical coupling of the system of FIG. 1;

FIG. 3 is a side view of the lever of FIG. 1 incorporating a force feedback device;

FIG. 4 is a schematic side view of an interface between a motor shaft and a casing comprising a force feedback device according to an embodiment of the invention, viewed in an operational configuration excluding any electrical malfunction;

FIG. 5 is a schematic top view of the motor/casing interface of FIG. 4 in the operational configuration;

FIG. 6 is a schematic side view of the motor/casing interface comprising the force feedback device of FIG. 4, viewed in a locking configuration in the event of an electrical malfunction;

FIG. 7 is a schematic top view of the motor/casing interface of FIG. 4 in the locking configuration.

DETAILED DESCRIPTION OF EMBODIMENTS

The examples below relate to a force application device intended to operate with a control stick that is rotary along roll and pitch axes. The invention is however applicable with the same advantages to a lever that is rotary along a single axis or else along any number of axes.

In the description hereinafter and in the appended figures, similar elements are associated with the same alphanumeric references.

Overall Architecture of the Control System

FIGS. 1 to 3 represent a control system of an aircraft, comprising a control stick, according to an exemplary embodiment.

The stick is typically located in the aircraft cockpit. The stick is usable by the aircraft pilot to control movable parts of the aircraft electronically.

In FIG. 1, the bold solid lines between two functional units correspond to mechanical connections, the bold connecting arrow lines represent a mechanical or magnetic coupling of two units (with possible uncoupling) and the fine connecting arrow lines are electronic connections allowing data transmission.

The control stick comprises a control lever 1, mounted rotatably with respect to a jig 2. The force application device comprises a mechanical coupling 10. The lever 1 is rotary along a roll axis X and a pitch axis Y, the two axes being orthogonal. The mechanical coupling 10 is attached to a jig 2 forming a single part with the floor of the aircraft cockpit.

In this example, the control stick comprises an electric motor 3a comprising a drive shaft of axis A linked to the roll axis X of the lever. The term "linked to the so axis" should be understood to mean that a linking mechanism exists between the shaft of axis A and an element of the jig 2 set in motion when the lever pivots along the X axis. Similarly, the stick comprises an electric motor 3b comprising a drive shaft of axis B linked to the pitch axis Y of the lever.

As an alternative, the motor 3a could be arranged to work directly on the axis X via a turning shaft linked to the coupling 10 and the motor 3b could be arranged to work directly on the axis Y via a turning shaft linked to the coupling 10.

The motors 3a and 3b are configured to apply a force on their respective drive shaft. Preferably, the force applied by the motors is computed according to a force law, as a function of the position of the lever.

To acquire the lever position information, the stick preferably comprises sensors of the angular displacement of the lever. Said sensors preferably comprise a sensor 11a associated with the roll axis and a sensor 11b associated with the pitch axis. Said sensors communicate electronic position signals to a computer 12.

According to an example, the sensors 11a and 11b acquire a rotary position of the drive shafts, along the axes A and B respectively.

The computer 12 comprises an electronic interface with the sensors. It can thus receive acquired data about the angular displacement of the lever. Optionally, the sensors 11a and 11b are also configured to communicate to the computer 12 information about the rotation speed of the lever 1 along their associated axes.

The information about the position/speed of the lever are translated into control signals for controlling the movable parts of the aircraft by an FCS or Flight Control System 13 of the aircraft.

As an option, the control stick comprises force sensors 15a and 15b associated with the roll axis X and the pitch axis Y of the lever respectively. Said sensors are configured to measure the torque exerted on the lever pivoting about the axis X and the axis Y. The force sensors 15a and 15b are typically strain gauges, for example of capacitive or piezoelectric type.

Such force sensors are particularly useful if the system comprises a force control mode, in addition to a displacement control mode, operational examples of which will be described in relation to the embodiments hereinafter. In a force control mode, the lever 1 is immobilized and the control unit 8 determines control signals of the movable parts of the aircraft as a function of the forces applied to the lever 1 by the pilot.

The view of FIG. 1 illustrates, in addition to the elements described above, a plurality of force application devices which will be described hereinafter.

In a form of embodiment, illustrated in the appended figures, each of the force application motors 3a and 3b comprises its own force application device, constituting a mechanical back-up line for this motor.

To simplify, only one first force application device will be described and illustrated in FIGS. 4 to 8, the second device being identical.

In FIG. 1, the alphanumeric references ending in the letter 'a' correspond to the roll axis X. The references ending in the letter 'b' are the same, transposed to the pitch axis Y.

FIG. 2 represents a structural example of embodiment of the lever 1 mounted on the mechanical coupling 10. The coupling 10 is mounted on the jig 2 which forms a single part with an airframe of the aircraft. The force application motors 3a and 3b (not visible) are here remote with respect to the lever.

The lever 1 is free at one end and attached to a first plate 101 at the other end. The first plate 101 is rotationally movable along the axis X and the axis Y and is linked to a second plate 102 of the jig 2. The axis X is linked to the first plate 101, such that a pivot of the first plate 101 about the axis Y makes the axis X pivot about the axis Y.

Two transmissions, each comprising a Cardan joint, express a rotational movement of the lever along the X axis, respectively along the Y axis, into a rotational movement of the associated drive shaft (not shown) extending along the axis A and B respectively.

The drive shafts of the motors are thus mechanically linked to the lever. The motors 3a and 3b are in direct engagement on the mechanical coupling 10 can transmit a resistive or motive force in response to the pivot movements of the lever 1 by the pilot, according to a force law or a predetermined damping law.

FIG. 3 represents the control stick and the force application device in side view. The lever 1 is here in the neutral position. The neutral position corresponds to a position in which the control commands work neither in roll nor in pitch on the movable parts of the aircraft. The lever 1 is mounted on the cabin of the cockpit at the level of a base having a bellows 16. The motors 3a and 3b are therefore hidden by the walls of the aircraft compartment.

The roll motor 3a and the pitch motor 3b are, in this example, of identical dimensions. The elements providing the mechanical back-up channel of the motors are here located under the motors, inside the unit 50. The drive shafts associated with the motors extend inside the unit 50. The latter is fixed with respect to the casing 4.

For more details on the structure of the mechanical coupling 10 and the mechanical link with the motors 3a and 3b, refer to FIG. 1 of the document FR 3 011 815 and the description pertaining thereto.

Force Application Device

The control system comprises a mechanical back-up channel for at least one of the force feedback motors 3a and 3b (and preferably, for each of these motors), in order to prevent the rotation of the lever 1 being completely free in the event of an electrical fault affecting said motor. The remainder of the text will describe the mechanical back-up channel for the roll motor 3a driving the shaft 41a of axis A. Owing to the mechanical back-up, in the event of a fault the pilot retains a force feedback or "haptic feedback".

The back-up channel is realized by the force application device comprising a first pin 30a, a second pin 40a, means 7a for clamping the first pin and the second pin, an electromagnet 5a, an actuator 6a comprising a magnetic material and a casing 4. The casing is secured to a jig of the aircraft. The force application device has two separate configurations:

an operational configuration, wherein the actuator 6a is located in a position bearing the reference 6-2 in the figures, wherein the electromagnet 5a is active and exerts a force on the actuator 6a, a locking configuration, wherein the electromagnet is inactive and wherein the actuator 6a is found in a retracted position bearing reference 6-1 in the figures. The first pin 30a then undergoes a resistive force opposing rotational movements of the first pin 30a with respect to the casing 4 about the axis A, a first tooth 71 and a second tooth 74 of the clamping means 7a clamping together the first pin 30a and the second pin 40a.

Thus, the fact of supplying current to the electromagnet 5a, or cutting the current, causes a displacement of the actuator 6a and a change of configuration of the force application device.

The casing 4 being fixed with respect to the jig 2 and the first pin 30a being connected to the drive shaft 41a of the motor 3a, the pilot feels a resistive force when he tries to displace the lever 1 in the roll direction, while the force application device is in the locking configuration—despite the fault of the roll electric motor 3a.

An example of a structure of the force application device is given hereinafter.

First Pin and Second Pin

The first pin 30a is mounted on the drive shaft of axis A, i.e., the first pin 30a moves in rotation with the shaft about the axis A.

In this example, the first pin is a nipple. The nipple is of cylindrical shape and protrudes from a part of a surface part 42a rotationally moving with the shaft. The first pin can turn with respect to the casing 4.

The second pin 40a is, in the neutral position represented in FIG. 4, coaxial with the first pin 30a. An axial separation 31 exists between the first pin 30a and the second pin 40a.

The second pin 40a is also a nipple of cylindrical shape.

Advantageously, the force application device further comprises a damping piece, preferably a viscous damping piece 14a, extending transversally in the axial separation 31 between the first pin 30a and the second pin 40a.

The second pin 40a protrudes from a surface above an annular part 79, the part 79 being attached to the casing 4.

Electromagnet and Actuator

The electromagnet 5a is powered by a current source of the control system of the aircraft. If said system is off or faulty, the electromagnet does not produce any particular magnetic field.

In the two modes hereinafter, and in a preferred configuration, the electromagnet and the roll motor 3a are supplied with power by the same electrical current source. Thus, when the motor is functional, the electromagnet transforms the electric current into a magnetic field, and in the event of an electrical malfunction affecting the roll motor 3a, the electromagnet is also affected by the malfunction and does not produce any magnetic field.

The loss of action of the electromagnet is thus automatic and immediate in the event of loss of the current of the roll motor 3a.

The electromagnet 5a is associated with an actuator 6a.

The actuator 6a is "passive" in the example hereinafter. Its displacement and its mechanical action on the pins depend on the magnetic interaction with the field of the electromagnet.

The actuator 6a comprises a magnetic material. Here the term "magnetic material" should be understood to mean a metallic material reacting to the magnetic field, such that the power supply of the electromagnet displaces the actuator.

In the example hereinafter, the material of the actuator 6a is chosen of opposite polarity to that of the electromagnet 5a. Thus:

when the electromagnet is supplied with current, the actuator 6a is forced in a direction away from the electromagnet;

when the electromagnet is not supplied with current, particularly in the event of a malfunction, the actuator is not forced to remain separated from the electromagnet, and the actuator comes closer to the electromagnet. The actuator thus enters a retracted position in the locking configuration.

As an alternative, if the polarity of the magnetic material of the actuator is the same as that of the electromagnet, the actuator is forced in a direction closer to the electromagnet when the electromagnet is supplied with electric current.

Means of Clamping the Pins

The clamping means comprise a first tooth 71 and a second tooth 74 rotationally movable with respect to the casing 4 and also with respect to the first pin and the second pin. In the example hereinafter, the clamping means 7a comprise a first jaw 70 and a second jaw 73 movable with respect to the casing 4, the first tooth 71 belonging to the first jaw and the second tooth 74 belonging to the second jaw. The teeth 71 and 74 have free surfaces arranged to extend facing one another when the jaws are in the clamped position. The teeth 71 and 74 tend to align the two pins along a direction parallel to the axis A when the force application device is in the locking configuration.

The first pin 30a and the second pin 40a thus have a sufficient axial extension (here along the axis A) for the teeth 71 and 74 of the clamping means to engage with the lateral faces of the two pins, in order to clamp the two pins together.

However, the clamping force of the jaws 70 and 73 is not sufficient to prevent any misalignment of the first pin 30a with respect to the second pin 40b.

Specifically, there exists a rotational clearance between the first pin 30a and the second pin 40a, even when the clamping means (here the jaws) exert a force on the two pins.

FIGS. 4 to 7 relate to a particular embodiment of the force application device with a mechanical back-up channel.

In this mode, the second pin 40a is mounted fixed with respect to the casing 4. Here, the second pin 40a is mounted to form a single part with the fastening part 79. The fastening part 79 is attached to the casing 4 via attaching means, here bolts.

In the operational configuration of the device, the actuator 6a is positioned between the two teeth 71 and 74. The actuator then unclamps the clamping means, so that the first pin 30a does not tend to align with the second pin 40a.

In the locking configuration of the device, the actuator 6a does not act on the two teeth 71 and 74. The clamping means have a mechanical equilibrium position wherein the first pin 30a tends to align with the second pin 40a, the latter forming a single part with the casing 4.

FIGS. 4 and 5 represent a normal state of the system, the actuator being in the normal operational configuration of the roll motor 3a.

FIG. 4 is a side view of the system, along a viewing direction vertical with respect to the view of FIG. 5, in top-to-bottom direction on FIG. 5. The actuator and the electromagnet are not represented in FIG. 4, for better visibility.

The first jaw 70 extends under the surface part 42a. The first jaw comprises a central circular plate, drilled at its center to allow an attachment to pass through which immobilizes the jaw 70 in translation along the axis A with respect to the fastening part 79. The jaw 70 is rotationally movable about the axis A.

The second jaw 73 comprises a central circular plate, drilled at its center to allow the attachment to pass through. The casing and the two jaws 70 and 73 are fixed in translation with respect to one another.

The jaws 70 and 73 are in a separated position which does not correspond to a mechanical equilibrium position. In the separated position, a separation 77 exists between the teeth 71 and 74, due to the position of the actuator 6a. A free end of the first pin 30a and a free end of the second pin 40a extend inside the separation 77.

In this example, the actuator 6a comprises a magnetic piston 61 arranged to engage in the separation 77 and maintain a minimum separation, in the operational configuration of the device.

As illustrated in FIG. 5, the magnetic piston 61 is mounted on one arm 610, on which the piston 61 is translationally movable. The arm 610 extends along a direction contained in a plane perpendicular to the axis A. The piston 61 is arranged facing the separation 77. In the extended position, the piston 61 enters the separation 77. The jaws 70 and 73 are thus maintained in their separated position.

FIGS. 6 and 7 show a damage state of the roll motor 3a. The level of electric current in the electromagnet 5a is then not sufficient for the electromagnet to be active. The force application device is thus in the locking configuration.

The actuator 6a (here the piston 61) is no longer subject to the magnetic field of the electromagnet. The piston 61 of the actuator therefore enters a retracted position and withdraws along the arm 610. Thus, the piston no longer maintains the separation 77 between the teeth.

The jaws 70 and 73 are therefore displaced into their mechanical equilibrium position, in the direction of a clamping of the pins 30a and 40a.

In this example, the jaw 70 comprises a radial bump extending outside the attachment, the bump ending in an end 72. The jaw 71 comprises a radial bump extending outside the attachment, terminating in an end 73. The ends 72 and 73 are attached to the casing 4 by a respective return means, for example a respective spring 78 as illustrated in FIG. 7.

In the position of FIGS. 6 and 7, said return means are compressed. It will be understood that in the position of FIGS. 4 and 5, the return means are forced to relax due to the separation of the jaws.

In the locking configuration, the element 77 is closed and the teeth 71 and 74 therefore come into contact with the pins, as visible in FIG. 6.

Operating Sequence of the Device with a Fixed Neutral Point

In the normal operational condition, for example when the aircraft is in flight, the actuator 6a is in the extended position of FIGS. 4 and 5. The jaws 70 and 73 are unclamped.

The roll motor 3a preferably exerts a resistive force opposing the roll movement imposed by the pilot on the lever 1. The mechanical back-up channel is not active.

In the event of a malfunction, and particularly in the event of an electrical fault at the level of the motor 3a—or where applicable in the event of a mechanical fault of the motor and/or in the event of a malfunction in the control signal processing line of the motor 3a—the electromagnet no longer produces any particular magnetic field. The force application device enters a locking configuration. The actuator 6a, and particularly the piston 61, is automatically displaced into a retracted position in which the jaws 70 and 73 are clamped. The first pin 30a tends to be aligned with respect to the second pin 40a.

The second pin 40a being fixed with respect to the casing, a resistive force is exerted on the first pin 30a in the event of displacement of the first pin 30a with respect to the second pin 40a.

The resistive force exerted by the clamping means tends to bring the first pin 30a, and consequently the drive shaft of the roll motor 3a, toward a fixed point aligned with the second pin 40a.

The drive shaft being mechanically coupled to the control lever 1 by way of the mechanical coupling 10, the resistive force exerted by the device tends to bring the lever 1 into a fixed neutral point on the roll axis, preferably toward a central position of the lever.

The neutral fixed point does not depend on the position of the first pin and therefore does not depend on the position of the lever 1 of the roll axis at the time the malfunction which led to the disabling of the electromagnet was caused. In other words, the neutral point is constant.

A mode of displacement control is entered: the clamping means 7a realize a damping law against the movements exerted by the pilot aiming to move the lever 1 away from its fixed neutral point.

The invention claimed is:

1. A force application device for a control stick of an aircraft, wherein the control stick comprises a control lever connected to at least one motor comprising a drive shaft, the drive shaft being rotationally movable about an axis, the force application device comprising:
   a first pin, configured to be connected to the drive shaft,
   a casing, configured to be fixed with respect to the aircraft,
   a second pin, attached to the casing,
   an electromagnet, fixed with respect to the casing,
   an actuator that is movable with respect to the casing, said actuator comprising a magnetic material, such that said actuator is displaceable as a function of a supply of current to the electromagnet,
   means for clamping the first pin and the second pin, comprising a first tooth and a second tooth, the first tooth and the second tooth being movable with respect to the first pin and the second pin,
   the force application device having an operational configuration wherein the electromagnet is active and the actuator is positioned between the first tooth and the second tooth such that the first tooth and the second tooth are separated at a distance from the first pin and the second pin, and a locking configuration wherein the electromagnet is inactive and the actuator is retracted such that the first tooth and the second tooth are in contact with the first pin and the second pin.

2. The force application device as claimed in claim 1, wherein the actuator comprises a magnetic piston.

3. The force application device as claimed in claim 2, wherein a direction of displacement of the magnetic piston belongs to a plane orthogonal to a longitudinal direction of the first pin and orthogonal to a longitudinal direction of the second pin.

4. The force application device as claimed in claim 1, wherein the clamping means include a first jaw and a second jaw, and wherein one end of the first jaw and one end of the second jaw are linked to the casing by return means.

5. The force application device as claimed in claim 1, further comprising an angular displacement sensor configured to acquire a measurement of the angular displacement of the drive shaft.

6. The force application device as claimed in claim 1, further comprising a damping part extending over a contact surface between the first pin and the second pin.

7. A control stick of an aircraft comprising a control lever, comprising at least one motor having a drive shaft, the drive shaft being rotationally movable about an axis, the stick further comprising one force application device as claimed in claim 1 per motor.

* * * * *